United States Patent
Buhl et al.

(10) Patent No.: US 6,805,408 B2
(45) Date of Patent: Oct. 19, 2004

(54) FITTING FOR A VEHICLE SEAT

(75) Inventors: Karl-Heinz Buhl, Kaiserslautern (DE); Richard Salewski, Kaiserslautern (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 10/414,727

(22) Filed: Apr. 16, 2003

(65) Prior Publication Data

US 2003/0197409 A1 Oct. 23, 2003

(30) Foreign Application Priority Data

Apr. 19, 2002 (DE) .......................................... 102 17 501

(51) Int. Cl.$^7$ ................................................. B60N 2/22
(52) U.S. Cl. .................. 297/344.15; 297/334; 297/335; 297/361.1
(58) Field of Search ................................. 297/334, 335, 297/336, 344.15, 361.1

(56) References Cited

U.S. PATENT DOCUMENTS

| 4,636,003 | A | * | 1/1987 | Siebler ........................ 297/336 |
| 4,828,323 | A | * | 5/1989 | Brodersen et al. ..... 297/411.36 |
| 5,577,805 | A | * | 11/1996 | Glinter et al. ......... 297/378.12 |
| 5,810,443 | A | * | 9/1998 | Blanchard .............. 297/378.12 |
| 6,520,581 | B1 | * | 2/2003 | Tame ......................... 297/336 |

FOREIGN PATENT DOCUMENTS

| DE | 4324702 C1 | * | 10/1994 |
| DE | 195 14 380 A1 | | 11/1995 |

* cited by examiner

Primary Examiner—Peter M. Cuomo
Assistant Examiner—Joseph Edell
(74) Attorney, Agent, or Firm—Alston & Bird LLP

(57) ABSTRACT

In the case of a fitting (21) for a vehicle seat, in particular for a motor vehicle seat, having at least two functional regions (15, 23), which are assigned in each case to the relative movement and/or unlocking of different components (11, 25; 25, 5) of the vehicle seat (1), and interrogation device (35, 45, 61) between the functional regions (15, 23), the interrogation device (35, 45, 61) have a pulling device (61), which is designed in closed form, between the functional regions (15, 23).

19 Claims, 4 Drawing Sheets

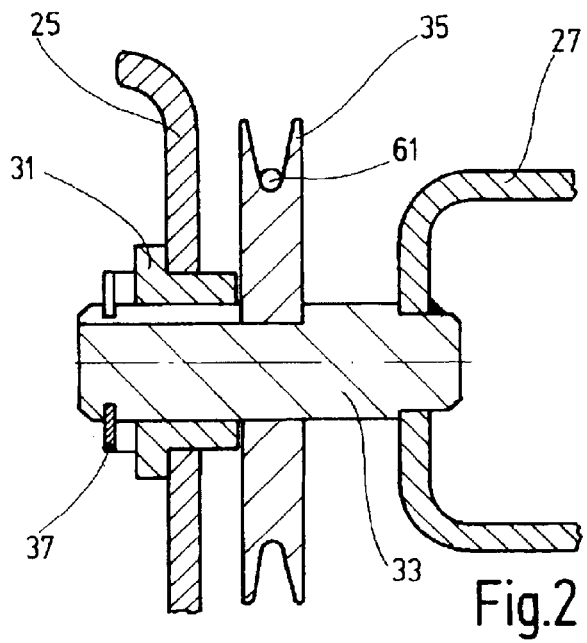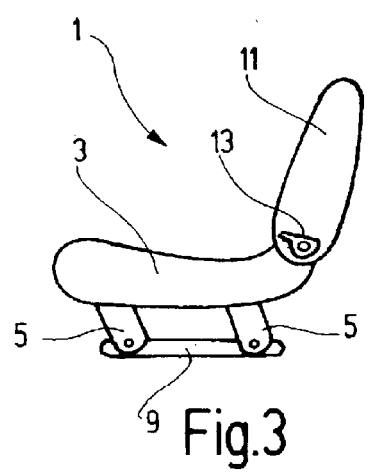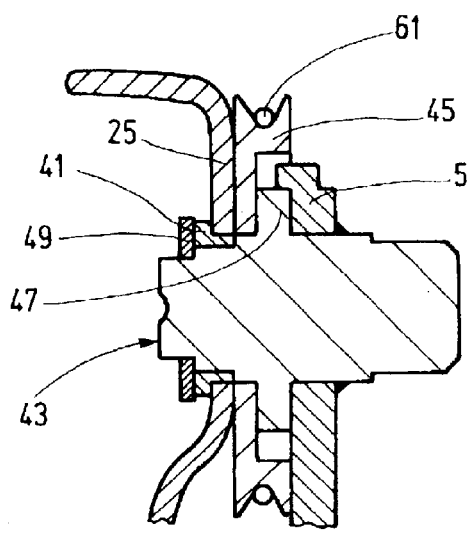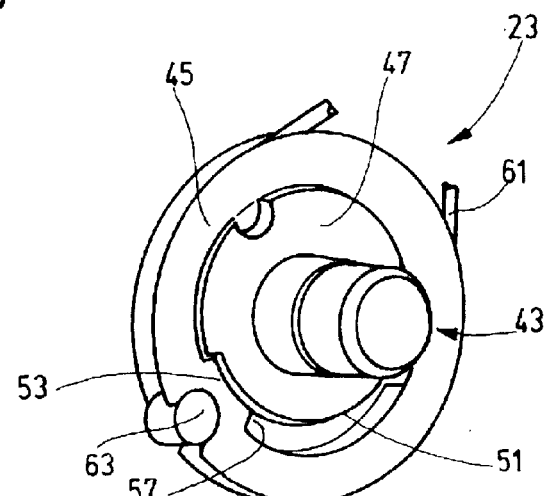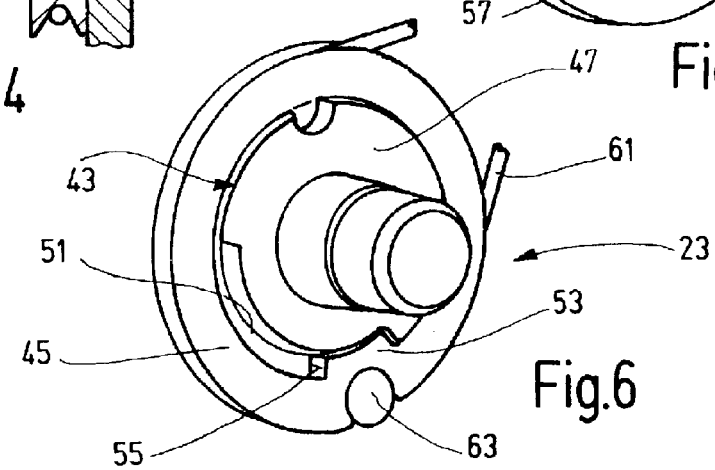

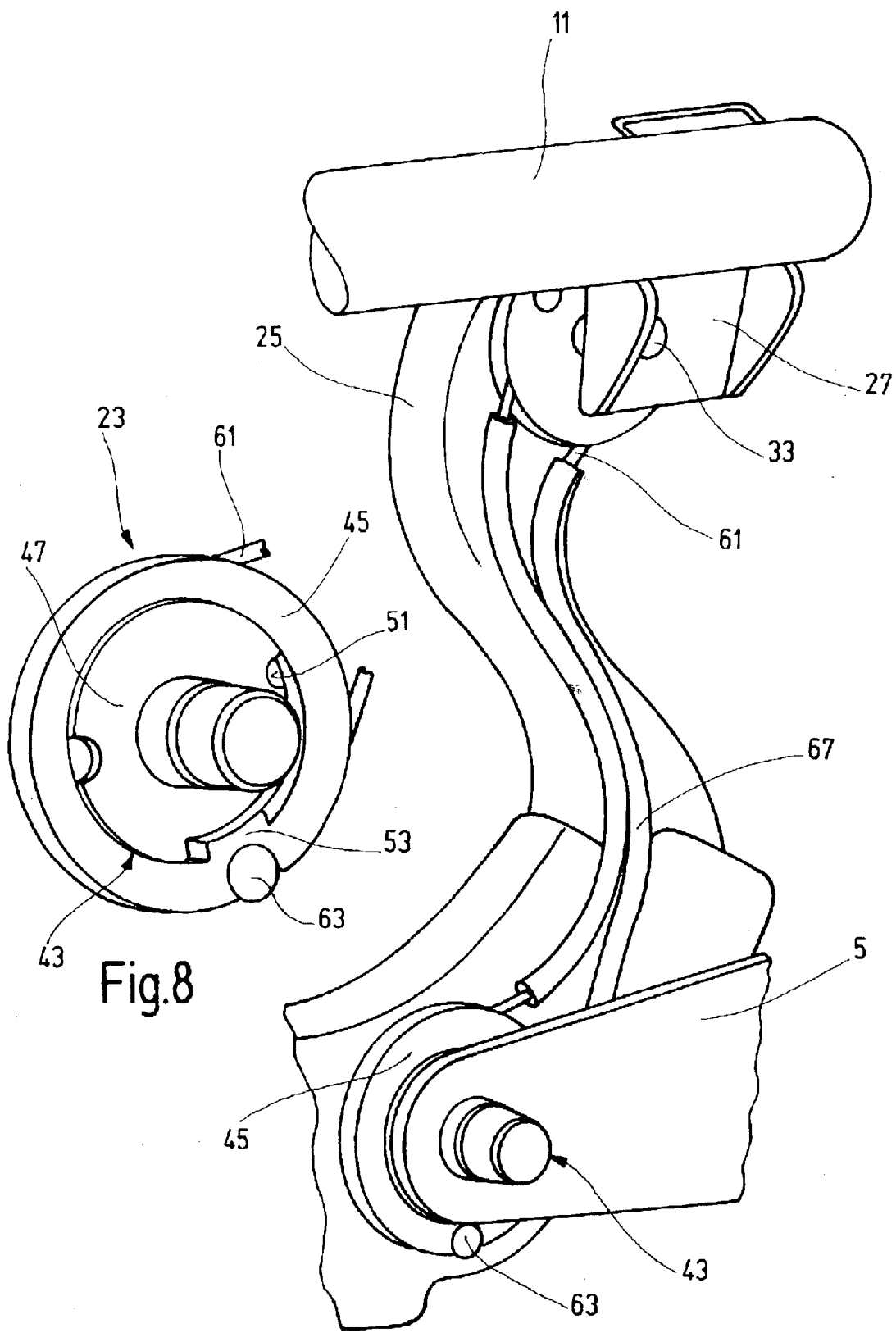

FITTING FOR A VEHICLE SEAT

BACKGROUND OF THE INVENTION

The present invention relates to a fitting for a vehicle seat, in particular for a motor vehicle seat, having at least two functional regions, which are in each case assigned to the relative movement and/or unlocking of different components of the vehicle seat, and interrogation means between the functional regions.

DE 195 14 380 A1 discloses a fitting of the above-described type which has, in a first functional region on the axis of rotation of the backrest, a control disk which is stepped in the radial direction and which is interrogated by means of a control finger. The control finger is connected via a Bowden cable to a locking device of a floor-locking means as a second functional region. Before the floor-locking means is unlocked, the interrogation means are used to find out the position of the backrest.

BRIEF SUMMARY OF THE INVENTION

An aspect of the present invention is the provision of a fitting that is generally of the type mentioned above, but that further includes expanded functioning options.

In accordance with one aspect of the present invention, a fitting for a vehicle seat, in particular for a motor vehicle seat, has at least two functional regions, which are in each case assigned to the relative movement and/or unlocking of different components of the vehicle seat, and interrogation means between the functional regions, wherein the interrogation means includes pulling means, which is designed in closed form, between the functional regions.

Because the interrogation means has a pulling means, which is designed in closed form (i.e. is guided as a loop), between the functional regions, pulling forces can be transmitted in two opposite directions via said pulling means, i.e. mutual interrogations of the functional regions take place in both directions, with the result that the two functional regions are kinematically coupled. This design enables forces caused by misuse to be absorbed, thereby preventing the vehicle seat from being operated incorrectly in a manner contravening safety regulations. The interrogation function and load-absorbing means are preferably separated, i.e. the pulling means has only to transmit or absorb the abovementioned forces caused by misuse. A cable, a strap or a chain, for example, may be used as the pulling means.

Rollers, over which the pulling means is guided in the functional regions, offer the advantage of low friction and, in the event of the pulling means being fitted in a rotationally fixed manner to the roller, for example with drivers in the manner of a seal, under which a defined engagement of gearwheels and chains is also to be understood, offer the advantage of it being possible for a torque to be transmitted. It is possible, by selection of the diameter of the roller, for the forces caused by misuse to be reduced, so that they can be better absorbed. The first roller, which is assigned to the first functional region, is therefore preferably connected in a rotationally fixed manner to a pivotable component of the vehicle seat in order to transmit the pivoting movement of this component to the pulling means. The second roller, which is assigned to the second functional region, can then be mounted in a freely rotatable manner, in which case the pulling means preferably transmits the position and rotational movement of the first roller to the second roller, i.e. is effective between the two functional regions without the use of any components possibly operating in the self-locking range. The second roller preferably then has a stop which limits and, in particular, depending on the current position, prevents, a pivoting movement of a further pivotable component of the vehicle seat or of a unit connected in a rotationally fixed manner to this component, so that the former component and this further component are kinematically coupled to each other for interrogation purposes and for preventing misuse.

In a structurally preferred design, the second roller is designed with a somewhat larger diameter and fits over the unit, which is smaller in diameter and has a locking disk with a cutout which extends radially inward, the stops of the second roller being formed on a radially inwardly pointing cam arranged within the cutout. This arrangement saves on structural space, reduces a torque introduced via the unit and, at the same time, protects the interacting subregions of the cam and cutout from external influences from the radial direction.

The invention can be used in all vehicle seats in which the movement of different components is to be coupled via interrogation, for example, the backrest-pivoting movement together with a movement of a height adjuster or a longitudinal adjuster or with the locking state of a locking device.

BRIEF DESCRIPTION OF THE DRAWINGS

The invention is explained in greater detail below with reference to an exemplary embodiment and a modification illustrated in the drawings, in which:

FIG. 2 illustrates a section through the upper joint, FIG. 3 is a diagrammatic side view of a vehicle seat, FIG. 4 illustrates a section through the lower joint, FIG. 5 illustrates a perspective view of the lower joint in the use position of the vehicle seat, FIG. 6 is a perspective view of the lower joint with the backrest folded forward, FIG. 7 is a perspective view of the exemplary embodiment in the floor position of the vehicle seat, and FIG. 8 is a perspective view of the lower joint in the floor position of the vehicle seat.

DETAILED DESCRIPTION OF THE INVENTION

Figure 1:
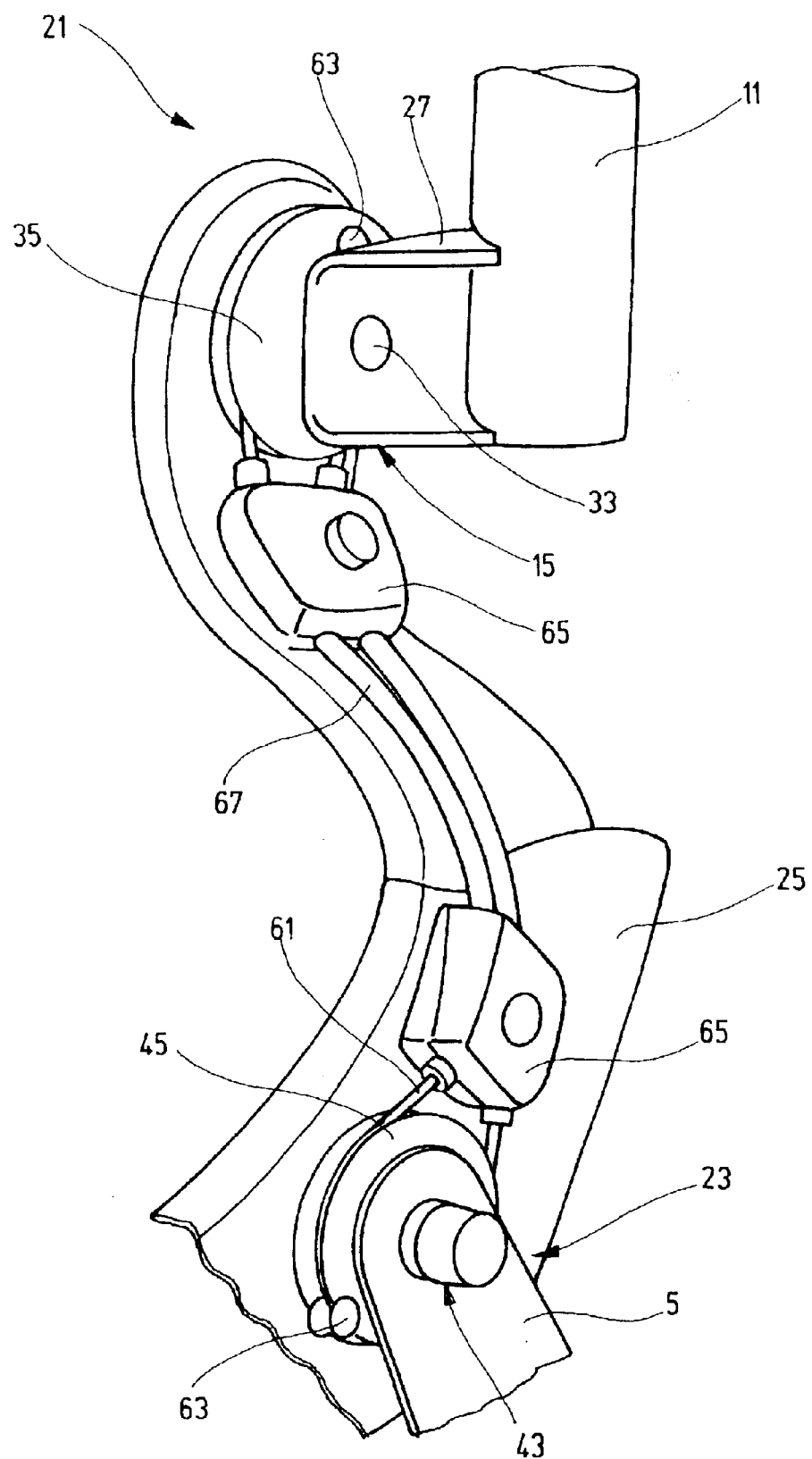
FIG. 1 is a perspective view of the exemplary embodiment in the use position of the vehicle seat.
Figure 9:
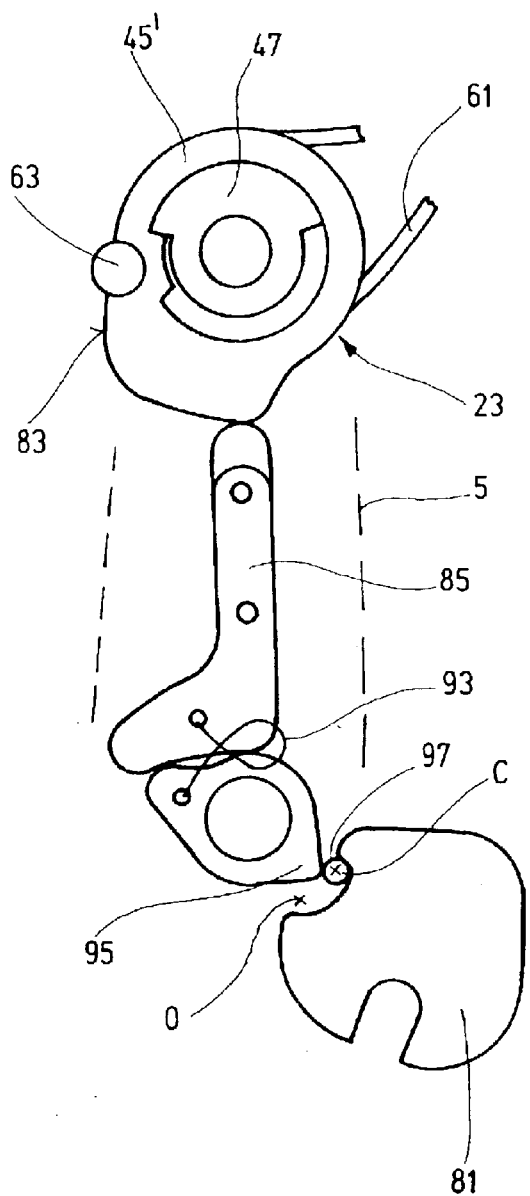
FIG. 9 is a partial view of the modification in the use position.
Figure 10:
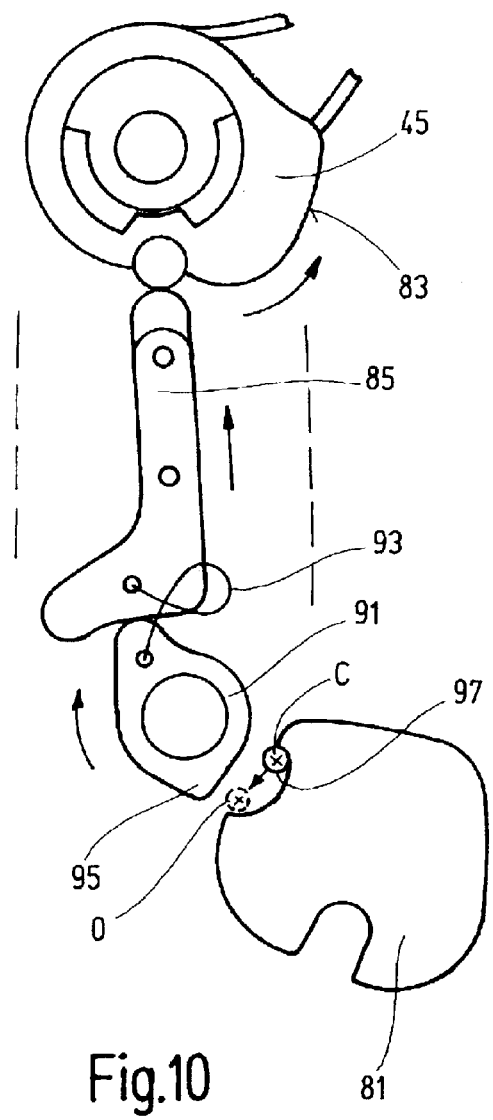
FIG. 10 is a view corresponding to FIG. 9 after the backrest is folded forward.

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements.

In the case of a vehicle seat 1 in a rear row of seats of a motor vehicle, a seat part 3 is fitted to a console 9, which is fixed on the vehicle structure, by way of four legs 5 forming a four-bar linkage on each side of the seat. At the same time, the four-bar linkage forms part of a height adjuster. A backrest 11 of the vehicle seat is fitted pivotably to the seat part 3 by way of a backrest adjuster 13, on the left side of the seat in the exemplary embodiment, and by way of an upper joint 15, on the right side. The vehicle seat 1 can be brought from a use position, in which a person can be seated, into a flat floor position by the backrest 11 first of all being folded onto the seat part 3 and then the legs 5 being pivoted forward and downward, i.e. onto the console 9.

In the exemplary embodiment, the vehicle seat 1 has a combined fitting 21 on the right at the rear. The fitting 21 includes, as a first functional region, the abovementioned upper joint 15, by way of which the backrest 11 is articulated on the seat-frame side part 25 via a backrest adapter 27, which is fixed on the backrest structure. The upper joint 15 is assigned to the relative movement of said backrest. The combined fitting 21 also includes, as a second functional region, a lower joint 23, by way of which the right, rear leg 5 is articulated on a seat-frame side part 25 of the seat part 3. The lower joint 23 is assigned to the relative movement of the right, rear leg 5. The two functional regions of the fitting 21 are kinematically coupled to each other.

The upper joint 15 includes a first bearing bushing 31 which is pressed into the seat-frame side part 25 and in which a bearing shaft 33 is rotatably mounted. On that side of the seat-frame side part 25 which faces inward, i.e. to the left in the present case, a control disk 35, which is designed in the manner of a roller, i.e. is provided with a groove in the circumferential direction on the outer surface, is seated in a rotationally fixed manner on the bearing shaft 33 which, in a further extension, is pressed into the backrest adapter 27 and is welded thereto. On that side of the seat-frame side part 25 which faces outward, the bearing shaft 33 is secured in its axial direction by a first securing ring 37 or the like.

The lower joint 23 includes, as a second functional region of the fitting 21, a second bearing bushing 41 which is pressed into the seat-frame side part 25 and in which a locking unit 43 is rotatably mounted. The locking unit 43 is designed essentially as shaft(s) having different diameters. On that side of the seat-frame side part 25 which faces inward, i.e. to the left in the present case, a stop disk 45, which is designed in the manner of a roller, is rotatably mounted on a section which is larger in diameter than the second bearing bushing 41. Adjoining said section, as the next section of the locking unit 43, is a locking disk 47 with a larger diameter which corresponds approximately to half of the diameter of the stop disk 45. The right, rear leg 5 is pushed onto the adjoining, free end of the locking unit and is connected, welded in the present case, in a rotationally fixed manner to the locking unit 43. On that side of the seat-frame side part 25 which faces outward, the locking unit 43 is secured in its axial direction by a second securing ring 49, or the like.

The stop disk 45 fits in the axial direction over the smaller locking disk 47 which is arranged further inward. In this case, the locking disk 47 has, over approximately a third of its circumference, a cutout 51 which extends radially inward and in which a radially inwardly projecting cam 53, which is significantly shorter in the circumferential direction, of the stop disk 45 is arranged. The end surfaces of the cam 53 form a first and second stop 55 and 57 in the circumferential direction.

A cable 61, which serves as pulling means, namely the core of a Bowden cable, is provided with a seal-like driver 63 at its two ends and approximately in its center. The one end of the cable 61 is fitted in a rotationally fixed manner by means of the associated driver 63 to the control disk 35 as a first roller. From there, the cable 61 is guided over a certain circumferential region of the control disk 35, in the groove thereof, then on through a casing 67, which is present in some sections and is fitted to the seat-frame side part 25 by way of two casing holders 65, to the lower joint 25 and is guided there over a certain circumferential region in the groove of the stop disk 45 as a second roller, to which disk the cable 61 is connected in a rotationally fixed manner by the central driver 63. The cable 61 is guided from this driver 63 over a further circumferential region in the groove of the stop disk 45 and via a further casing 67, which is present in some sections and is fitted to the seat-frame side part 25 by means of the casing holders 65, back to the upper joint 15 where the cable 61, which runs over a further circumferential region through the groove of the control disk 35, is fitted in a rotationally fixed manner to the control disk 35 by means of the third driver 63 in the direct vicinity of the first driver 63. As a result, the cable 61 has a closed form. The control disk 35, the stop disk 45 and the cable 61 form interrogation means for the different functional regions of the fitting 21.

In the use position, the locking disk 47 bears against the first stop 55. For the transfer from the use position into the floor position, the backrest 11 has first of all to be unlocked and folded forward. In the process, the backrest adapter 27 uses the bearing shaft 33 to carry along the control disk 35 which rotates the stop disk 45 via the cable 61. When the backrest 11 has reached its end position, the second stop 57 bears against the locking disk 47. The legs 5 can now be unlocked and pivoted toward the console 9, with the right, rear leg 5 carrying along the locking unit 43 until, when the floor position is reached, the locking disk 47 again bears against the first stop 55. The return into the use position takes place in a reverse sequence.

The cable 61 couples the two joints 15 and 23 kinematically to each other in such a manner that only the described sequence is possible. If it is incorrectly attempted in the use position to pivot the legs 5 onto the console 9, the locking unit 43, and therefore the right, rear leg 5, is blocked by the locking disk 47 bearing against the first stop 55 and by the upright backrest 11, via the cable 61, i.e. the vehicle seat 1 cannot be lowered. If it is further incorrectly attempted to set the backrest 11 upright from the floor position, the backrest is likewise blocked via the cable 61 owing to the first stop 55 bearing against the locking disk 47.

A modification described below is largely identical to the exemplary embodiment and so identical components are referred to by the same reference numbers and the reference numbers of components acting in an identical manner are provided with a prime. The modification combines the interrogation connection which is already present between the first and second functional regions 15 and 23, i.e. between the backrest 11 and leg 5, with a further interrogation connection to a locking device 81 which is provided for releasably fastening the console 9 to the vehicle structure. The locking device 81 thus forms a third functional region.

A cam-like region having a radial cam 83 is integrally formed on the modified stop disk 45', the radial cam 83 extending along the circumference of the stop disk 45'. A slide 85 is guided moveably in the longitudinal direction along the leg 5, the slide 85 consisting of two flat parts which are arranged on different sides of the leg 5 and are connected by means of two rivets reaching through a longitudinal slot in the leg 5. The slide 85 is prestressed with its upper end against the radial cam 83 by means of a compression spring (not illustrated). Provided at its lower end is a catch 91 which is mounted rotatably on the leg 5 and bears with a section of material resembling a cam against the slide 85. A prestressed coupling spring 93 fitted to the slide 85 and the catch 91 secures the bearing of the catch 91 against the slide 85, i.e. it acts upon the catch 91 in the clockwise direction in the drawing.

The catch 91 has a lug 95 on the side lying radially opposite the section of material bearing against the slide 85. Arranged in the direct vicinity of the lug is an unlocking bolt 97 of the initially locked locking device 81, this locked position being referred to by C. In order to unlock the locking device 81, the unlocking bolt 97 has to be moved somewhat forward and downward into an unlocked position 0, which impedes the catch 91 in the use position described with the backrest 11 upright.

If the backrest 11 is pivoted forward and, as a result, the control disk 35 and, via the cable 61, the stop disk 45' are rotated, then a radially further rebounding part of the radial cam 83 is rotated toward the slide 85, i.e. the slide 85, owing to its prestress, is moved upward along the leg 5. The catch 91, which is prestressed by the coupling spring 93, can rotate, as a result of which the lug 95 is pivoted away. The unlocking bolt 97 can now be moved unhindered from the locked position C to the unlocked position 0, whereupon the locking device 81 is opened and the vehicle seat 1 can be removed.

In the normal case, during the return into the use position, first of all the locking device 81 is locked automatically when placed onto a bolt or the like in the vehicle structure, so that the unlocking bolt 97 is moved unhindered back into the locked position C. When the backrest 11 is pivoted back, the slide 85 is pressed downward via the radial cam 83, whereupon the slide 85 pivots the catch 91 back. The unlocking bolt 97 is now blocked again.

If, in the event of misuse, the backrest 11 and the leg 5 are put upright before the locking device 81 is locked, the catch 91 is actually in its blocking position. However, the unlocking bolt 97, which changes from the unlocked position O into the locked position C, can rotate the catch 91 in this direction and pass the lug 95. After that, the catch 91 pivots back into its blocking position owing to the spring force of the coupling spring 83.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A fitting for a vehicle seat having components, the fitting comprising:
   at least two functional regions that are mounted for respectively controlling different components of the vehicle seat, wherein each functional region functions to control at least one of:
      relative movement of the respective component of the vehicle seat, and
      unlocking of the respective component of the vehicle seat; and
   interrogation means for coordinating the functioning of the functional regions with respect to one another, wherein:
   the interrogation means includes pulling means having a closed geometric configuration for transmitting pulling forces between the functional regions,
   a first of the functional regions has a first roller over which the pulling means is guided,
   a second of the functional regions has a second roller over which the pulling means is guided,
   the second roller is mounted in a freely rotatable manner,
   the second roller has at least one stop which is for limiting a pivoting movement of a unit that is for being connected in a rotationally fixed manner to the respective component of the vehicle seat,
   the unit is smaller in diameter than the second roller,
   the second roller fits over the unit,
   the unit has a locking disk with a cutout which extends radially inward, and
   the stop of the second roller is part of a radially inwardly pointing cam positioned within the cutout.

2. A fitting according to claim 1, wherein the first roller is connected in a rotationally fixed manner to a pivotable component of the vehicle seat.

3. A fitting according to claim 2, wherein the pulling means transmits the position of the first roller to the second roller.

4. A fitting according to claim 2, wherein the pulling means is fitted in a rotationally fixed manner to the second roller.

5. A fitting according to claim 2, wherein the pulling means transmits the position of the first roller to the second roller.

6. A fitting according to claim 2, wherein the pulling means is fitted in a rotationally fixed manner to the first roller.

7. A fitting according to claim 6, wherein the pulling means is fitted in a rotationally fixed manner to the second roller.

8. A fitting according to claim 1, wherein the pulling means is fitted in a rotationally fixed manner to the second roller.

9. A fitting according to claim 1, further comprising a locking device for fastening the vehicle seat, wherein the first functional region or the second functional region interacts with the locking device for causing operation of the locking device.

10. A fitting according to claim 1, wherein:
    the fitting is in combination with the vehicle seat;
    the components of the vehicle seat include a backrest, a seat part, and at least one leg for supporting the seat part;
    the second functional region of the fitting is mounted for controlling pivoting of the leg; and
    the first functional region of the fitting is mounted for controlling pivoting of the backrest relative to the seat part.

11. A fitting according to claim 10, further comprising:
    a locking device for fastening the vehicle seat, wherein second functional region interacts with the locking device for coordinating the functioning of the first and second functional regions with operation of the locking device.

12. A fitting according to claim 11, wherein the locking device includes a movable unlocking bolt which:
    is retained in a locked position by a catch that is mounted for rotating, and can move to an unlocked position when the catch is rotated.

13. A fitting according to claim 1, wherein the pulling means transmits the position of the first roller to the second roller.

14. A fitting according to claim 1, further comprising a locking device for fastening the vehicle seat, wherein the second functional region interacts with the locking device for coordinating the functioning of the first and second functional regions and the locking device.

15. A fitting according to claim 14, wherein the locking device includes a movable unlocking bolt which:
is retained in a locked position by a catch that is mounted for rotating, and
can move to an unlocked position when the catch is rotated.

16. A fitting according to claim 15, wherein the catch is urged against a slide by a spring, and the slide is between the second functional region and the locking device for at least partially facilitating the interaction between the second functional region and the locking device, for coordinating the functioning of the second functional region and the operation of the locking device.

17. A fitting according to claim 15, wherein:
the catch is mounted for rotating into and out of a blocking position in which the catch is capable of retaining the unlocking bolt in the locked position; and
in the event of a misuse, if the catch is already in the blocking position and the unlocking bolt is still in the unlocked position, the catch can rotate when the unlocking bolt moves into the locked position.

18. A fitting according to claim 1, wherein:
the fitting further comprises a third functional region that is mounted for controlling a component of the vehicle seat that is different from the components respectively controlled by the first and second functional regions,
the third functional region functions to control at least one of:
relative movement of the respective component of the vehicle seat, and
unlocking of the respective component of the vehicle seat; and
the first functional region at least indirectly interacts with the third functional region for coordinating the functioning of the first functional region and functioning of the third functional region.

19. A fitting according to claim 1, wherein
the pulling means comprises a loop connecting the first and second functional regions for transmitting pulling forces between the first and second functional regions and thereby coordinating the functioning of the functional regions with respect to one another.

* * * * *